Dec. 23, 1930.  F. J. CANCIANICH  1,786,396
GAS BURNER
Filed Dec. 9, 1929   2 Sheets-Sheet 1

INVENTOR
F.J. Cancianich.
BY
ATTORNEY

Dec. 23, 1930.  F. J. CANCIÀNICH  1,786,396
GAS BURNER
Filed Dec. 9, 1929   2 Sheets-Sheet 2
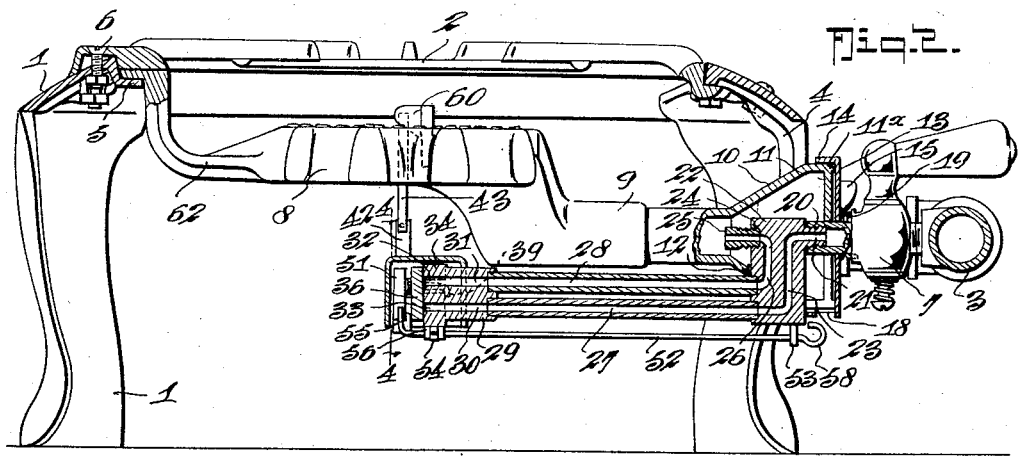
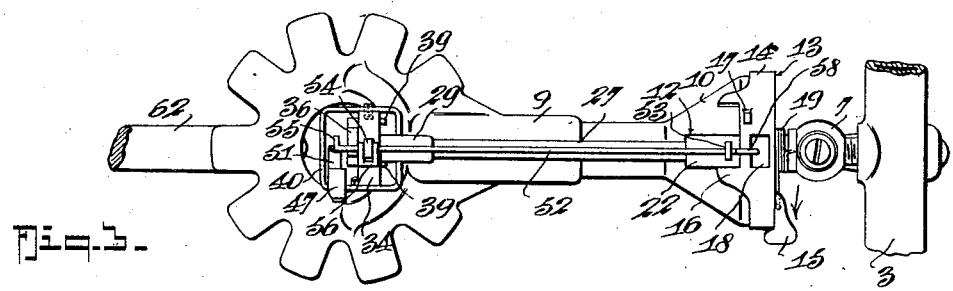
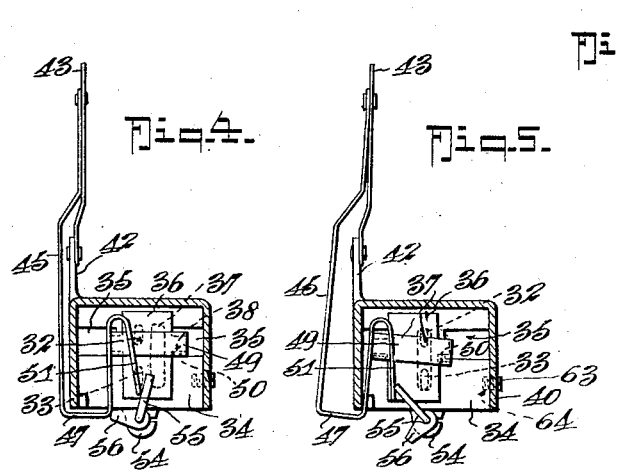
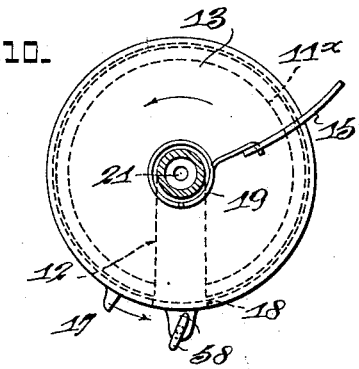
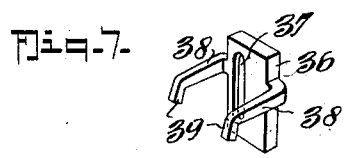
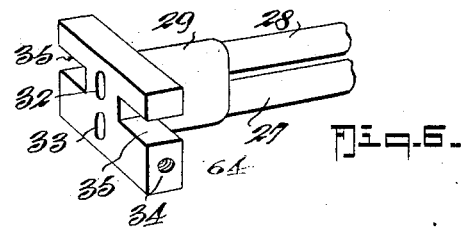
INVENTOR
F. J. Cancianich.
BY
ATTORNEY Patented Dec. 23, 1930

1,786,396

UNITED STATES PATENT OFFICE

FRANCIS J. CANCIANICH, OF NEWPORT NEWS, VIRGINIA

GAS BURNER

Application filed December 9, 1929. Serial No. 412,886.

My invention relates to burners of the heater type, such as are employed in stoves, furnaces, water heaters, etc. Burners of this type usually have provisions for mixing air with the gas before it issues from the burner orifices in order that proper combustion may occur. Usually air valves are provided adjacent the place where the gas enters the mixing tube and such air valves are usually adjusted to the normal flow of gas. Should the flow of gas be cut down so that the flow of air is proportionately excessive, the gas often "back-fires" and ignites at the place where it is admitted to the mixing tube. It is one of the objects of my invention to overcome this objectionable feature.

Further, it is an object of the invention to provide against the gas igniting in the mixing tube when the burner is turned down too low.

Another object is to provide an automatic shut-off mechanism for stopping the flow of gas entirely should the gas issuing from the burner orifices not be ignited, or having been ignited, be blown out or otherwise accidentally extinguished.

Further, it is an object to provide a burner with an automatic shut-off valve device that is controlled by a thermostat device and so cooperatively associated with the air valve of the mixing tube that the automatic shut-off valve is not initially opened until after the air valve has been moved to close the air ports in order that gas only will be liberated from the burner orifices to warm up the thermostat device until that device can hold the shut-off valve in the open position; after the thermostat has been warmed the air valve is released and automatically returned to the position at which it opens the air ports and permits the proper flow of air into the mixing tube to mix with the gas before passing out through the burner orifices.

Further, it is an object of the invention to provide a burner in which provision is made for the protection of the thermostat device against excessive heat that would likely damage it.

Further, it is an object to provide a burner by the employment of which a more efficient and economical use of gas is effected, resulting in a saving to the consumer as well as giving a better flame for heating purposes.

Further, it is an object to provide a burner for stoves, etc., whose air admission port is protected from dirt and drippings from the top of the stove which so frequently enter the openings of the air valves of the burners now in use and tend to clog the orifices of the burners as well as to reduce the area of the air openings of the valves.

Further, it is an object to provide a burner with an automatic shut-off valve which is a separate and distinct unit from the gas cock that controls the flow of gas from the supply pipe to the burner.

Further, it is an object of the invention to provide a gas burner for stoves and heaters which is of a simple construction, one that can be economically manufactured, one which will effectively serve its intended purposes and one which need not depart greatly from the conventional designs of burners now in general use.

Other objects will in part be obvious and in part be pointed out hereinafter.

To the attainment of the aforesaid objects and ends, my invention consists in the novel features of construction and in the combination, connection and arrangement of parts, hereinafter more fully described, and then pointed out in the appended claims.

In the drawings:

Figure 2 is a central vertical longitudinal section on the line 2—2 of Figure 1.

Figure 3 is an inverted plan of the burner unit per se.

Figure 4 is a cross section on the line 4—4 of Figure 2 looking in the direction of the arrow with the valve in the closed position.

Figure 5 is a detail view similar to Figure 4 with the valve in the open position.

Figure 6 is a detail perspective view of the valve seat body.

Figure 7 is a detail perspective view of the valve.

Figure 10 is a detail front elevation of the rotary air valve and the safety valve opening element.

Figure 1:
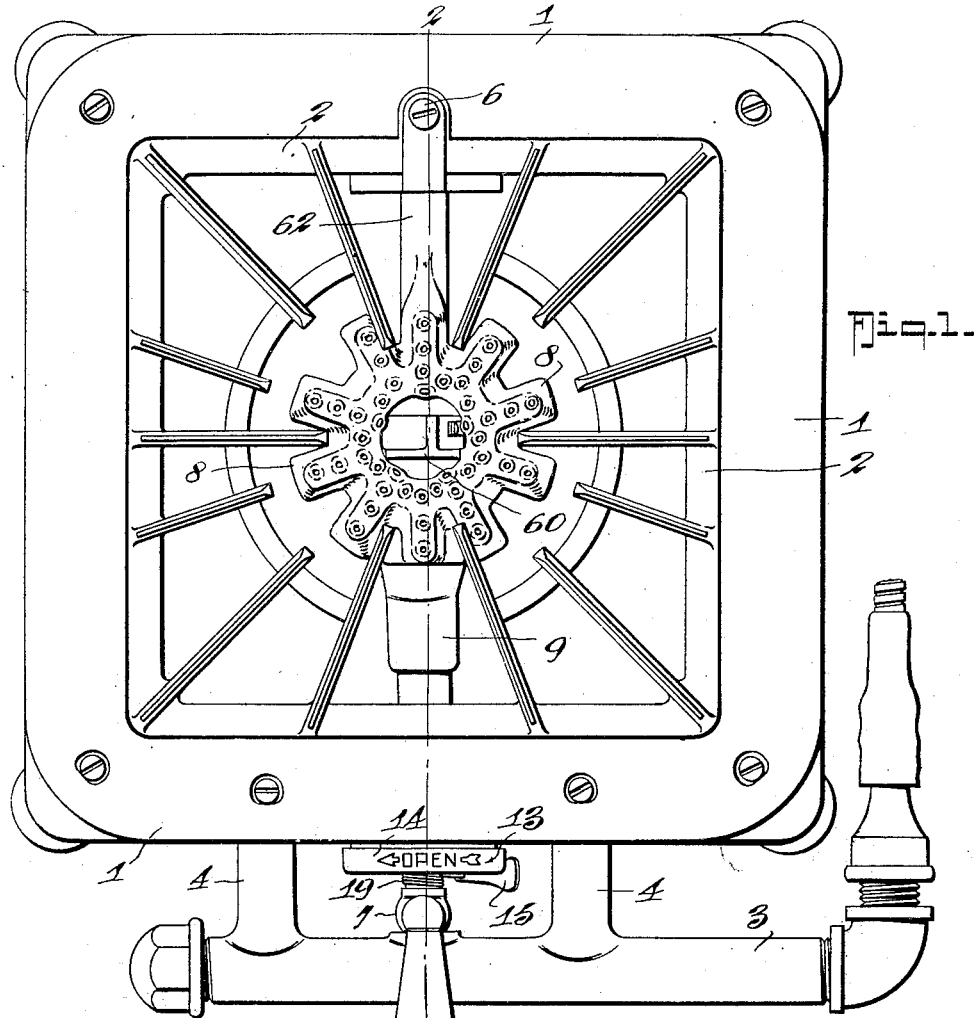
Figure 1 is a plan view of a single burner gas stove embodying my invention.
Figure 8:
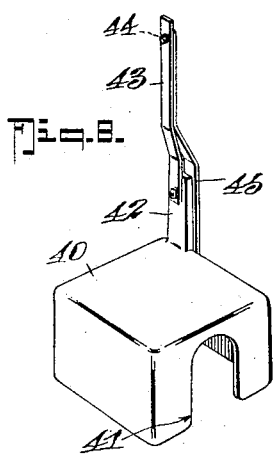
Figure 8 is a detail perspective view of the cover and thermostat bar.
Figure 9:
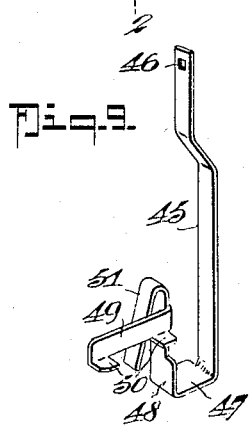
Figure 9 is a detail perspective view of the valve shifting unit.
Figure 11:
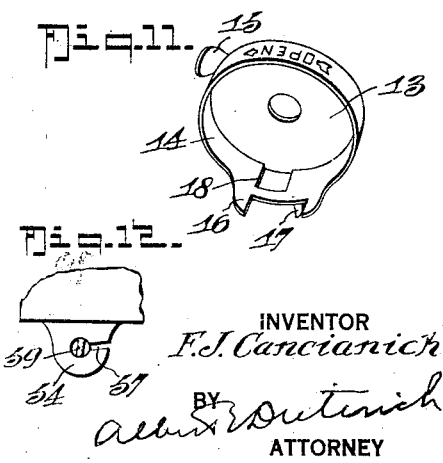
Figure 11 is a detail perspective view of the air valve element looking from the rear.
Figure 12:
Figure 12 is a detail view of the rear bearing member of the rockable rod.

In the drawings in which like numerals of reference indicate like parts in all of the figures and in which but one of the preferred embodiments of my invention is illustrated (though it is obvious that the invention may be applied to other burners than those of cooking stoves), 1 represents the frame of a stove having the usual grate 2, gas supply pipe 3 attached to the frame by brackets 4 and having a burner supporting ledge 5 over which the grate margin is held by a suitable screw or bolt 6. The usual shut-off cock 7 is provided where the burner gas connection is made with the supply pipe 3.

8 designates the burner proper which may be of any conventional form and is provided with a mixing tube 9, the bell end 10 of which, in my present invention, is preferably closed by a front wall 11 having a shallow flange 11x and a slot 12 so that the bell end of the mixing tube may fit over the union-block 22.

13 designates the air valve which in my invention performs a dual function, namely that of opening and closing the air passage through the slot 12 and also that of effecting an initial opening of the automatic shut-off valve. The air valve 13 has a peripheral flange 14 which fits over the cylindrical portion of the end of the bell 10 and is provided with a port 18 that normally is held in register with the lower part of the opening 12 by means of a coil spring 19, one end of which is fastened to the stop cock 7 and the other end engages the finger piece 15 of the valve 13, a stop 16 being provided to engage the union block 22 when the hole 18 is in register with the opening 12.

The valve 13 is also provided with a rod turning lug 17 that cooperates with the open eye 58 of the rockable rod 52 hereinafter again referred to.

20 is a pipe carried by the block 22 and connected to the stop cock 7. This pipe 20 has a passage 21 for conducting the gas from the stop cock to the duct 23 formed within the block 22, the duct 23 delivering the gas into a passage 27 by which it is conducted to the union 29 which is a part of the safety valve device. From the union 29 the gas is conveyed back through a pipe 28 to the block 22 and delivered into a passage 26 which conveys it to the gas tip 25 that is mounted at 24 in the block 22 and directs the gas into the mixing tube 9.

The member 29 has a duct 30 which conveys the gas from the pipe 27 to the port 33 and it has another duct 31 which conveys the gas from the port 32 to the pipe 28, the ports 32 and 33 being governed by the slidable safety valve 36 which has a port 37 adapted to bring the ports 32 and 33 into communication with the port 37 which is in register therewith.

The valve seat member has a vertical valve seat portion 34 and transverse slots 35.

The valve 36 has arms 38 which project through the slots 35 and carry inclined fingers 39 that rest on the edge of the support body 34 opposite to that having the valve seat face in order that the action of gravity may serve to hold the valve in place and also cause it to be pressed against the valve seat face with sufficient pressure to maintain a gas-tight contact while permitting the free sliding of the valve transversely along the slot 35, the arms 38 limiting this movement by engagement with the part of the body 34 that lies between the inner or adjacent ends of the slots.

A cap 40 is fitted over the member 34 and secured to it in any suitable manner as by a screw. This cap 40 has a slot 41 to fit over the member 29 and it also has a support 42 for the deformable thermostat element 43, the latter having a rivet hole 44 (preferably square).

The cap 40 is secured by a set screw 63 that taps into a hole 64 in the member 34.

It should be, of course, understood that the element 43 is flat and composed of two co-extensive leaves integrally secured together, and of metals having different coefficients of expansion, such as German silver and steel as is well known in the art of thermostats.

45 designates the valve moving arm which also has a rivet hole 46 so that by means of a suitable rivet the parts 43 and 45 may be secured together. The arm 45 has a portion 47 bent at right angles and then back up parallel to the arm as at 48. From this portion 48 there extends transversely a portion 49 having spaced fingers 50 that engage the sides of the valve 36 to move it in accordance with the movements of the arm 45 and thermostat element 43. From the upper end of the portion 48 of the arm there extends downwardly and divergingly a member 51, the purpose of which will now appear.

Mounted in suitable bearings 53 and 54 is a rockable rod 52 having a finger 55 at one end which is adapted to engage the element 51 for the purpose of manually moving it in one direction to shift the valve 36 from the closed to the open position. The rod 52 has a stop element 56 which cooperates with the element 34 to prevent the rod from turning too far in a direction away from the element 51.

In order to enable the convenient assembly of the parts the bearing 54 may be provided with a slot 57 and the rod may be provided with a flat portion 59 so that when the rod is turned to one position it may be slipped into or taken out of the bearing 54. The end of the rod 52 opposite that having the finger is provided with an open eye 58. This eye is adapted to be engaged by the rod turning lug 17 as hereinbefore referred to, and by reason of it being an open eye it can be unhooked from the bearing 53 or hooked through the bearing 53 in assembling the parts.

60 is a guard for the free end of the thermostat element 43. The purpose of this guard is to prevent accidental contact with the end of the thermostat element which might render it inoperative. It is to be noted that the thermostat element 43 extends above the end of the arm 45, the end of the arm 45 lying below the top plane of the burner so that there is practically no danger of a separation occurring between the elements 43 and 45, even though the upper or projecting end of the element 43 be burnt off.

The burner 8 is provided with an extension 62 that rests on the ledge 5 and is held in place by the securing of the grate in position.

In operation, when it is desired to light the burner the stop cock 7 is opened in the usual manner. Of course, no gas flows at this time because of the fact that the valve 36 keeps the ports 32 and 33 closed. The operator then turns the air valve 13 against the tension of the spring 19 which first causes the opening 12 controlled thereby to be closed and shuts off the supply of air to the bell 10 of the mixing tube. Further movement of the air valve 13 in the same direction brings the lug 17 into engagement with the eye 58 of the rod 52 and rocks that rod in a direction to cause its finger 55 to press against the resilient portion 51 of the valve moving arm 45 and moves that arm in a direction to cause its fingers 50 to push the valve 36 from the closed position to the open position, thereby permitting gas to flow via ports 33, 37, 32 to the tip 25 where it is delivered into the mixing tube 29, passing through said tube to the burner proper 8 and issuing from the apertures thereof. Upon igniting the gas as it issues from the burner orifices the thermostat element 43 will be heated and cause it to assume a buckled position which will hold the valve 36 in the open position. After the gas has been burning a few seconds, long enough to warm up the thermostat device, the operator releases the air valve 13 which is returned by its spring 19 to the normal position with the openings 18 and 12 in register.

Now, should the gas pressure fail in the mains due to any cause whatever so that the flame at the burner becomes extinguished, the thermostat device will quickly cool down and in cooling it will re-assume its normal state or form and cause the arm 45 to slide the valve back to the closed position as well as to restore the rod 52 to its normal position with the stop 56 in engagement with the body of the element 34. Should the gas pressure again rise in the mains the fact that the gas cock 7 is open is of no consequence since the gas will be cut off from the burner by means of the shut-off valve 36.

Further, should the flame of the burner be blown out, gas is prevented from escaping by reason of the closing of the ports 33, 32 by the valve 36 which is brought to the closed position upon the cooling down of the thermostat element.

It is to be noted that one of the orifices of the burner through which the gas issues, is preferably so located as to direct its flame against the tip of the thermostat device 43.

Since the opening 12 and its control port are at the bottom of the bell and valve any drippings from the stove will not enter the same. Thus clogging is prevented.

Further, the spring 19 keeps the air valve against the flange 11x.

It should also be noted that if the spring 19 should break, nevertheless the action of the spring member 51 on the element 55 would be sufficient to cause the element 58 to move the element 14 with its lug 17 backwardly sufficiently to enable the valve 36 to be moved to the closed position. In other words, the presence of the spring 19 is not essential to the automatic operation of the valve 36 from an open to a closed position.

From the foregoing description, taken in connection with the accompanying drawings, it is thought the construction, operation and advantages of my invention will be clear to those skilled in the art to which it relates.

What I claim is:

1. In heating burners, a support, a gas supply pipe with a stop cock, and a burner mounted on said support, said burner including a mixing tube having an entrant end, a gas pipe from the stop cock, a shut-off valve, a thermostatic device located adjacent the burner proper so as to be effected by the heat from the burner to actuate said shut-off valve, means conducting gas from said gas pipe to said shut-off valve, means conducting gas from said shut-off valve and delivering it into said mixing tube, said entrant end having an air admission opening, an air valve fitted over said opening and having a port cooperating therewith, means in virtue of which said air valve may be moved to close said air admission opening and means operated by said air valve for opening said shut-off valve.

2. In heating burners, a support, a gas supply pipe with a stop cock and a burner mounted on said support, said burner including a mixing tube having an entrant end, a gas pipe from the stop cock, a shut-off valve, a thermostatic device located adjacent the burner proper so as to be effected by the heat from the burner to actuate said shut-off valve, means conducting gas from said gas pipe to said shut-off valve, means conducting gas from said shut-off valve and delivering it into said mixing tube, said entrant end having an air admission opening, an air valve fitted over said opening and having a port cooperating therewith, means in virtue of which said air valve may be moved to close said air admission opening and means operated by said air valve for opening said shut-off valve after said air admission port has been closed and hold said shut-off valve open until the thermostat device warms up for the purpose described.

3. A gas burner which includes a burner proper, a mixing tube, means to admit gas and air separately into said tube, and an air valve controlling the admission of air; combined with a shut-off valve connected in the gas admitting means, a thermostatic device to hold said shut-off valve open when the gas is burning and to close the shut-off valve when the gas is not burning, and means located between said air valve and said shut-off valve for holding said shut-off valve open when said air valve is moved to shut off the air supply to the mixing tube.

4. A gas burner which includes a burner proper, a mixing tube, means to admit gas and air separately into said tube, and an air valve controlling the admission of air; combined with a shut-off valve connected in the gas admitting means, a thermostatic device to hold said shut-off valve open when the gas is burning and to close the shut-off valve when the gas is not burning, and means located between said air valve and said shut-off valve for holding said shut-off valve open when said air valve is moved to shut off the air supply to the mixing tube, said thermostatic device including a deformable element projected into the heat zone of the burner proper, and a stationary guard for the projected end of said deformable element.

5. A gas burner comprising a support, a burner proper mounted thereon and having a mixing tube with an entrance bell; means including an air valve to admit air into said bell; means to admit gas into said bell, said gas-admitting means including a stop-cock-controlled supply pipe, a shiftable shut-off valve, a duct from said stop-cock-controlled supply pipe to said shut-off valve, a duct from said shut-off valve to said bell for discharging gas into said mixing tube; and a thermostatic device for shifting said shut-off valve, means operated by said air valve when it is moved to shut off the air supply, to effect a shifting of said shiftable valve to establish a flow of gas to the mixing tube.

6. The combination with a gas burner having a mixing tube and separate gas and air admission means thereto; of a shut-off valve mechanism including a valve and an operating thermostatic device to control the gas flow to said mixing tube, and manually actuated means for closing off the air admission to said tube and effecting an opening of said shut-off valve mechanism.

7. The combination with a gas burner having a mixing tube and separate gas and air admission means thereto; of a shut-off valve mechanism including a valve and an operating thermostatic device to control the gas flow to said mixing tube, manually actuated means for closing off the air admission to said tube and effecting an opening of said shut-off valve mechanism, and spring means to open said air admission means when released from manual actuation.

8. The combination with a gas burner having a mixing tube and separate gas and air admission means thereto; of a shut-off valve mechanism including an operating thermostatic device to control the gas flow to said mixing tube, and manually actuated means for closing off the air admission to said tube and effecting an opening of said shut-off valve mechanism, said shut-off valve mechanism comprising a body having a vertically disposed valve seat surface with gas ports, a slide valve with a port for connecting said gas ports and a vertical face to contact said seat surface, means maintaining said slide valve in gas-tight contact with said seat surface, a hood over said body and valve, said thermostatic device comprising a deformable element mounted on said hood and projected into the heat zone of the burner proper, a valve shifting element secured to said deformable element and including fingers engaging said valve to shift it laterally for opening and closing the gas ports.

9. The combination with a gas burner having a mixing tube and separate gas and air admission means thereto; of a shut-off valve mechanism including an operating thermostatic device to control the gas flow to said mixing tube, and manually actuated means for closing off the air admission to said tube and effecting an opening of said shut-off valve mechanism, said shut-off valve mechanism comprising a body having a vertically disposed valve seat surface with gas ports, a slide valve with a port for connecting said gas ports and a vertical face to contact said seat surface, means maintaining said slide valve in gas-tight contact with said seat surface, a hood over said body and valve, said thermostatic device comprising a deformable element mounted on said hood and projected into the heat zone of the burner proper, a valve shifting element secured to said deformable element and including fingers engaging said valve to shift it laterally for opening and closing the gas ports, said shut-off valve opening means comprising a rock shaft having a finger to engage said valve shifting element.

10. The combination with a gas burner having a mixing tube and separate gas and air admission means thereto; of a shut-off valve mechanism including an operating thermostatic device to control the gas flow to said mixing tube, and manually actuated means for closing off the air admission to said tube and effecting an opening of said shut-off valve mechanism, said shut-off valve mechanism comprising a body having a vertically disposed valve seat surface with gas ports, a slide valve with a port for connecting said gas ports and a vertical face to contact said seat surface, means maintaining said slide valve in gas-tight contact with said seat surface, a hood over said body and valve, said thermostatic device comprising a deformable element mounted on said hood and projected into the heat zone of the burner proper, a valve shifting element secured to said deformable element and including fingers engaging said valve to shift it laterally for opening and closing the gas ports, said shut-off valve opening means comprising a rock shaft having a finger to engage said valve shifting element and having a projection to be engaged by said manually actuated means after the air admission to said tube has been cut off.

FRANCIS J. CANCIANICH.